United States Patent
Wang et al.

(10) Patent No.: US 6,697,224 B2
(45) Date of Patent: Feb. 24, 2004

(54) BASEPLATE FOR ARM AND SUSPENSION ASSEMBLY

(75) Inventors: Jeffery L. Wang, Hong Kong (HK); Kai Wu, Dongguan (CN)

(73) Assignee: SAE Magnetics (H. K.) Ltd., Hong Kong (HK)

( * ) Notice: Subject to any disclaimer, the term of this patent is extended or adjusted under 35 U.S.C. 154(b) by 48 days.

(21) Appl. No.: 09/932,655

(22) Filed: Aug. 17, 2001

(65) Prior Publication Data
US 2002/0145830 A1 Oct. 10, 2002

(30) Foreign Application Priority Data
Apr. 9, 2001 (WO) .............................. PCT/CN01/00551

(51) Int. Cl.$^7$ ................................................. G11B 5/596
(52) U.S. Cl. ..................................................... 360/244.6
(58) Field of Search ........................................ 360/244.6

(56) References Cited

U.S. PATENT DOCUMENTS

| | | | |
|---|---|---|---|
| 5,689,389 A | | 11/1997 | Braunheim |
| 5,717,545 A | * | 2/1998 | Brooks et al. ........... 360/244.6 |
| 6,046,885 A | | 4/2000 | Aimonetti et al. |
| 6,128,164 A | | 10/2000 | Kant et al. |

* cited by examiner

*Primary Examiner*—Robert S. Tupper
(74) *Attorney, Agent, or Firm*—Kenyon & Kenyon

(57) ABSTRACT

The present invention provides a baseplate comprising a cylindrical hub, a flat flange, and one or two circular notches of a "V" or "U" shape etc. formed in said flange. This baseplate has the advantages of smaller deformation and larger retention torque during swage operation. Also it is easy to make and has no further cost in production. Moreover, the present invention further provides an arm and suspension assembly equipped with the baseplate and a hard disk drive equipped with the arm and suspension assembly.

15 Claims, 5 Drawing Sheets

SECTION A-A

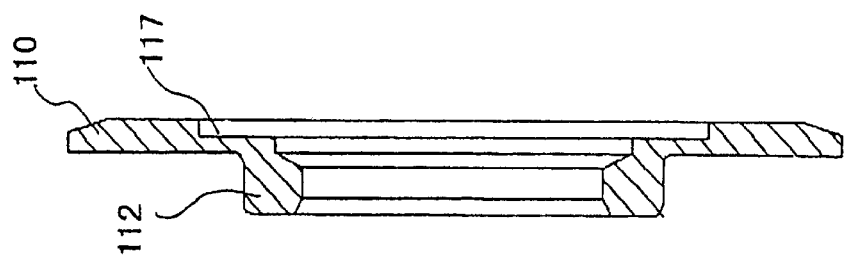
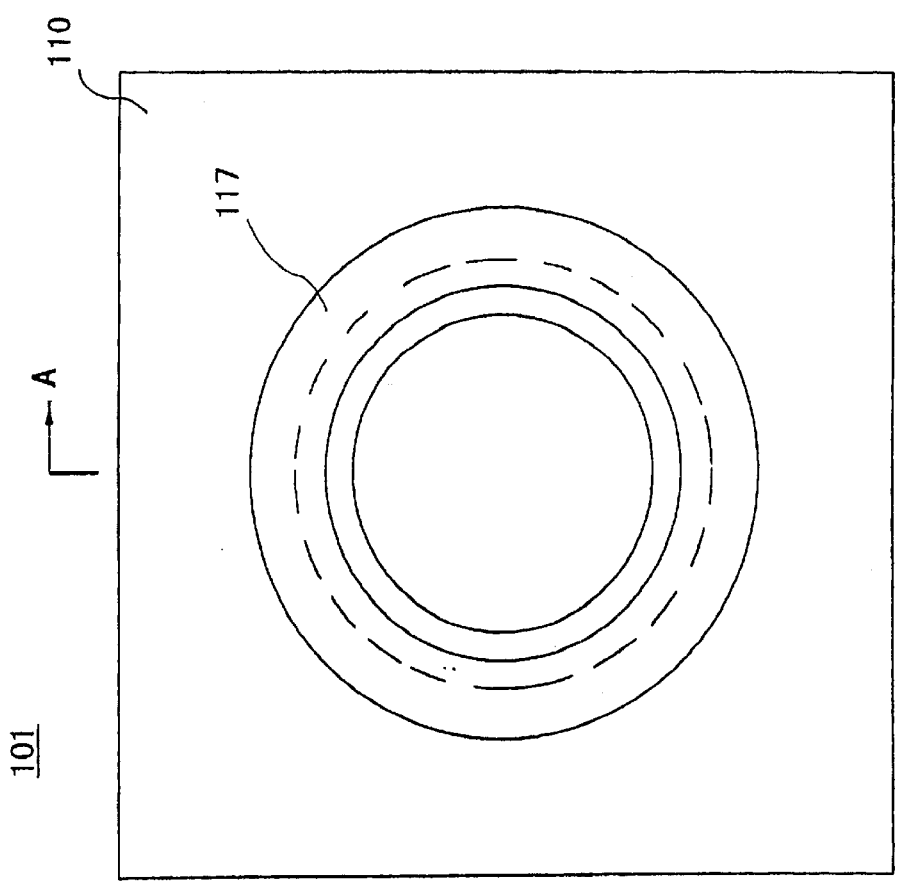
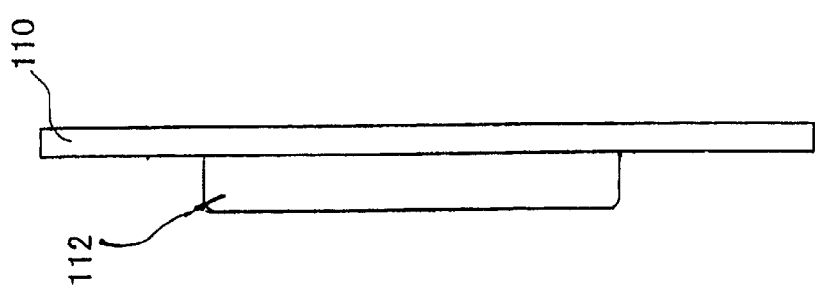
FIG. 3a
FIG. 3b
FIG. 3c SECTION A-A

BASEPLATE FOR ARM AND SUSPENSION ASSEMBLY

FIELD OF THE INVENTION

The present invention relates to a disk head assembly for supporting read/write heads adjacent rotating disks in a disk drive and more particularly, to a baseplate for attaching a head suspension assembly to a head actuator arm.

BACKGROUND OF THE INVENTION

In hard disk drives data are stored on magnetizable surfaces of a plurality of rotatable disks that are mounted in a coaxial stack on a housing of the drive. Transducer heads that write data to and read data from the disk surfaces are supported by an actuator that is mounted on the housing and can be actuated to position the transducer heads in alignment with concentric data tracks defined on the disks. Each transducer head is attached to one end of a head suspension that is connected to an actuator arm that extends from the actuator body. The suspensions include a flexible load beam constructed of light steel sheet that has a bend formed in it. The load beam acts as a spring that forces the head against the disk surface with an accurate pre-load or "gram load". Air turbulence caused by the rotating disks lifts the heads slightly off the disks so that the heads fly on an air bearing across the disk surfaces. The air bearing force is counteracted by the suspension gram load.

A head-carrying suspension is attached to an actuator arm using a baseplate that forms a part of the head suspension. The baseplate includes a flat flange portion and cylindrical hub portion or boss. The baseplate hub is passed through a load beam clearance hole and the flange is spot welded to the load beam. The combined baseplate, load beam and a flexure make up a head suspension, and the suspension has the hub of the baseplate extending through and beyond the load beam clearance hole.

The hubs of two suspensions are inserted into an actuator arm boss hole formed through an actuator arm extending from an actuator body, one hub entering an actuator arm boss hole from each end of the hole. A swage ball is passed through the cylindrical hubs to force the peripheries of the hubs to expand (swage) into tight engagement with the inner peripheries of the actuator arm boss hole. Thus, an actuator arm may carry two suspensions on opposite sides thereof to support two transducer heads in opposing directions, one up and one down.

A typical baseplate has two primary regions, flange region and a hub region. The flange region is a flat portion to which the load beam is welded. This area preferably remains flat and free from distortion so that it serves as a stable mounting feature for the load beam and ideally remains so throughout the swaging operation. The hub region is an extended boss whose upper end is contiguous with the flange portion and whose lower end passes through boss clearance holes in both the load beam and the actuator arm. The hub region supplies the retention torque between the baseplate, which is welded to the load beam, and the actuator arm by plastically expanding and cold working during the swaging operation, creating a press fit with the actuator arm.

U.S. Pat. No. 6,128,164 issued to Rishi Kant et al. on Oct. 3, 2000 discloses a disk drive having a head-gimbal assembly (HGA) which is attached to an actuator arm of an actuator assembly. The HGA includes a read/write head, a flexure, and a suspension arm. The suspension arm has a first end including the flexure supporting the read/write head, and a second end including a hole having an attached swaging member extending through it. The swaging member includes a baseplate and a swaging boss which interface at an annulus region. A circular hole is formed through a top surface of the baseplate and extends downward partially through the swaging member. A non-circular hole, concentric with the circular hole, is formed through a bottom surface of the swaging boss, and extends upward partially through the swaging member. The non-circular hole has a smaller diameter than the circular hole. The shape of the non-circular hole may be any geometric shape such as a two-lobed swaging hole, a three-lobed swaging hole, an elliptical hole or a hexagonal hole. The swage boss of the swaging member is inserted into an opening in the actuator arm. A compatible non-circular key, which is a rod of the same configuration and size as the non-circular hole, is inserted through the hole and non-circular hole in the swaging member. The non-circular key is held at both ends by a fixture and turned so that the non-circular bole is deformed. The swage boss expands in size to form a tight interface fit with the actuator arm. The plastic deformation of the swaging member is located at an interface region between the baseplate and the swaging boss.

U.S. Pat. No. 6,046,885 issued to Kim Aimonetti et al. on Apr. 4, 2000 discloses a baseplate having a hub, a flange having an outer flange region at an outer periphery of the flange that is contiguous with the hub. The flange has a modified region that at least partially surrounds and is contiguous with the clamping region, the modified region having a stress reducing configuration such that the clamping region is thicker than the outer flange region. The modified region may be a circular or linear step, and can be on either side of the flange. The step fits the contour of a load beam and the flange is welded to the load beam. The load beam thickness is the same as or less than the thickness of the step.

In the prior art, a problem with this process is that the baseplate flange becomes warped by stress from the hub during the swaging operation. Consequently, the load beam, which is welded to the baseplate flange, is deformed by the warping of the baseplate flange, adversely affecting the gram load on the transducer head and the retention torque between the baseplate and arm.

The problems of gram load variation and retention torque loose result from the fact that connection part between the flange region and hub region is too strong.

It is, therefore, desirable to provide an actuator arm assembly for a magnetic disk unit in which the baseplate flange region almost frees from distortion and the hub region plastically expands larger during a swaging operation so that the gram load change will be smaller and the retention torque between the baseplate will be larger.

SUMMARY OF THE INVENTION

Therefore, an object of the present invention is to provide a baseplate for an arm and suspension assembly.

A further object of the present invention is to provide an arm and suspension assembly which is equipped with the baseplate.

A still further object of the present invention is to provide a hard disk drive which is equipped with the arm and suspension assembly A baseplate in accordance with the present invention comprises a cylindrical hub, a flat flange and a circular notch formed in said flange.

A circular notch at the connection part between the flange region and hub region can make the hub region easily plastically expanded and flange region almost free from distortion.

During a swaging operation with notched baseplate, the deformation of baseplate flange region will be smaller and that of the hub region will be larger. Thus smaller gram load change and larger retention torque will be got.

BRIEF DESCRIPTION OF THE DRAWINGS

The invention will be described in greater detail with reference to the drawings in which:

FIG. 1c is a side elevation view of a baseplate taken along line A—A of FIG. 1a;

FIG. 3a is a side view of a baseplate illustrating a first embodiment of the invention;

FIG. 3b is a top view of a baseplate illustrating a first embodiment of the invention;

FIG. 3c is a side elevation view of a baseplate taken along line A—A of FIG.3b;

DESCRIPTION OF PREFERRED EMBODIMENTS

Figure 1C:
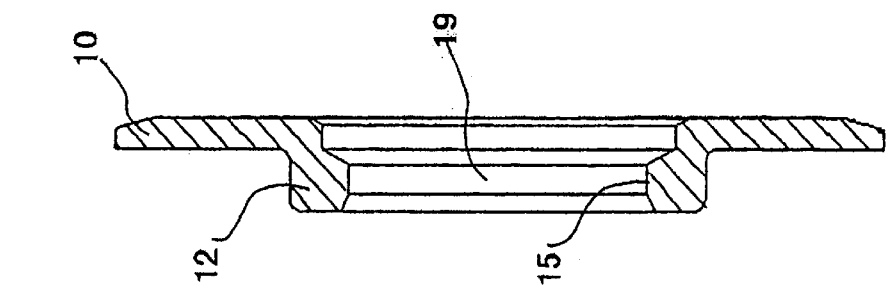

In the drawings, similar numerals refer to similar elements. It should be understood that the sizes of the different components in the drawings may not be to scale, or in exact proportion, and are shown for visual clarity and for the purpose of explanation.

Figure 1B:
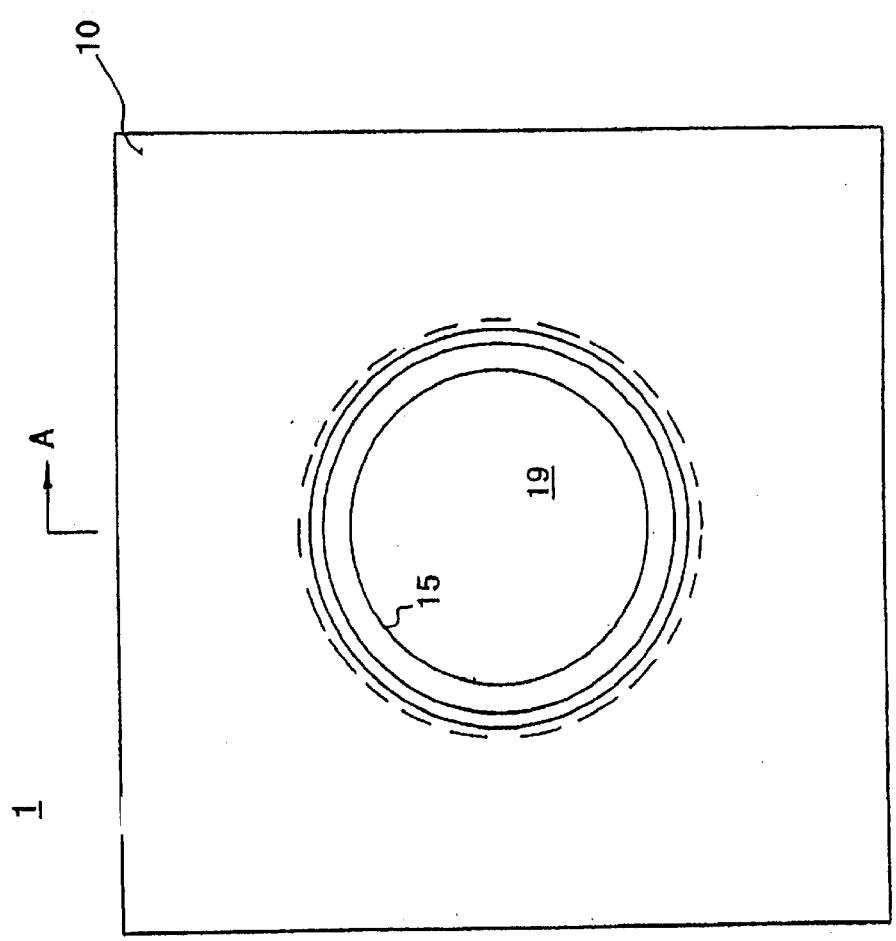
FIG. 1b is a top view of a baseplate of the prior art.
Figure 1A:
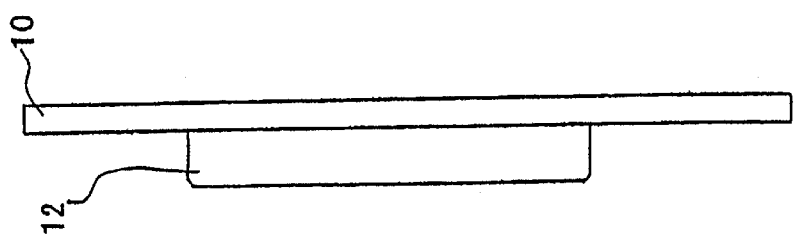
FIG. 1a is a side view of a baseplate of the prior art.
Figure 2:
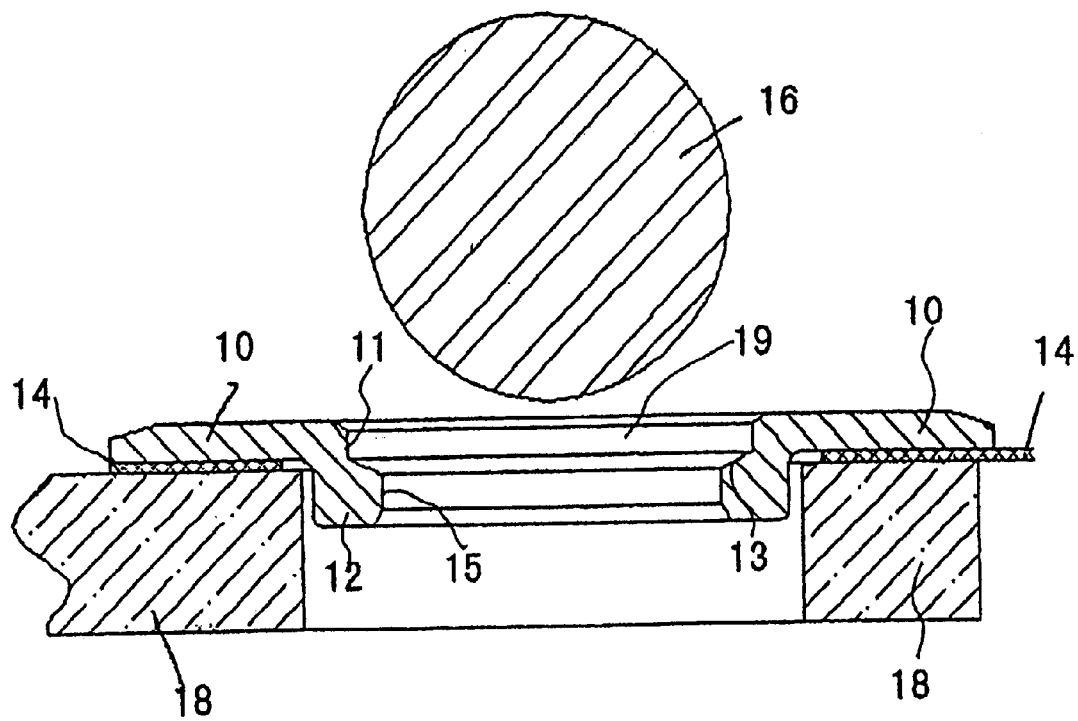
FIG. 2 is a side elevation view of the swaging process.

Refer to FIGS. 1 and 2 which illustrate a baseplate of the prior art. An actuator arm and transducer suspension assembly, which are elements of a head stack assembly (HSA), are connected end to end by the baseplate which is part of the transducer suspension assembly. The baseplate generally designated by numeral 1 includes a flat flange portion 10 and a cylindrical hub portion or boss 12. A baseplate typically has an inner barrel shape with a counter bore 11, a load-in chamfer 13 and an inner diameter 15. The counter bore 11 and inner diameter 15 are perpendicular to the plane of the baseplate flange 10. The hub 12 is inserted through a load beam boss clearance hole in a load beam 14 and the flange portion 10 is welded to the load beam. The hub is then inserted through an actuator arm boss hole in an actuator arm 18. As shown in FIG. 2, a swage ball 16 having a diameter slightly larger than the inner diameter 15 of the hub 12 is passed through the center inner barrel 19 of the baseplate 10 causing pressure to be applied to hub 12 so that the hub 12 expands into the boss hole in the actuator arm, rigidly connecting the hub and attached load beam to the actuator arm boss hole.

Now turn to FIGS. 3a, 3b and 3c. FIG. 3a is a side view of a baseplate 101 illustrating a first embodiment of the present invention, FIG. 3b is a top view of a baseplate of the first embodiment of the present invention, and FIG. 3c is a side elevation view of a baseplate taken along line A—A of FIG.3b. It can be seen from FIGS. 3b and 3c that there is a circular notch 117 formed at the connection part between the flange region 110 and the hub region 112, i.e., the corner from the flange region to the counter bore. In assembling the actuator arm, the hub 112 is inserted through a load beam boss clearance hole in a load beam. The flange portion 110 is welded to the load beam. The hub is then inserted through an actuator arm boss hole in the actuator arm. A swage ball is passed through the center inner barrel of the hub 112 causing pressure to be applied so that the hub 112 expands into the boss hole in the actuator arm, rigidly connecting the hub and attached load beam to the actuator arm boss hole. During the swaging operation of the notched baseplate 101, since the deformation of the flange region 110 of the baseplate is smaller than that of the hub region 112, a smaller gram change and a larger retention torque are achieved over the baseplate of the prior art as shown in FIGS. 1 and 2.

Figure 4:
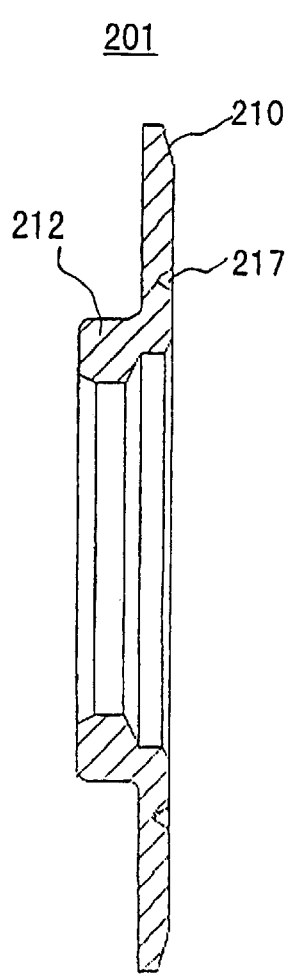
FIG. 4 is a side elevation view of the baseplate illustrating a second embodiment of the invention.

FIG. 4 is a side sectional view of a baseplate 201 illustrating a second embodiment of the present invention. As shown in FIG. 4, a circular notch of a V shaped section 217 is formed on the side of the flange 210 that is opposite to the hub 212. Alternatively, the notch could be U shaped in its section.

Figure 5:
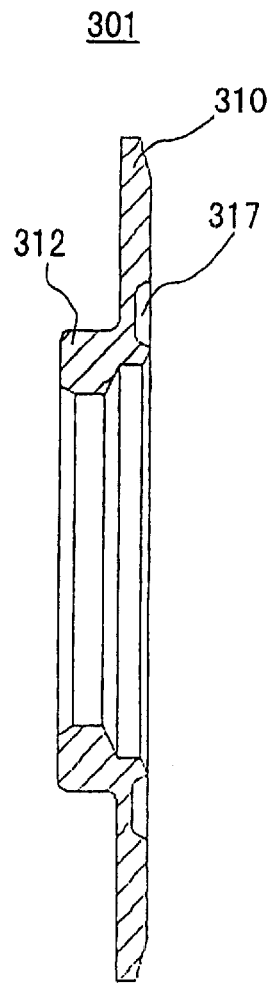
FIG. 5 is a side elevation view of the baseplate illustrating a third embodiment of the invention.

FIG. 5 is a side sectional view of a baseplate 301 illustrating a third embodiment of the present invention. As shown in FIG. 5, a circular notch of a substantial trapezoid shaped section 317 is formed on the side of the flange 310 that is opposite to the hub 312.

Figure 6:
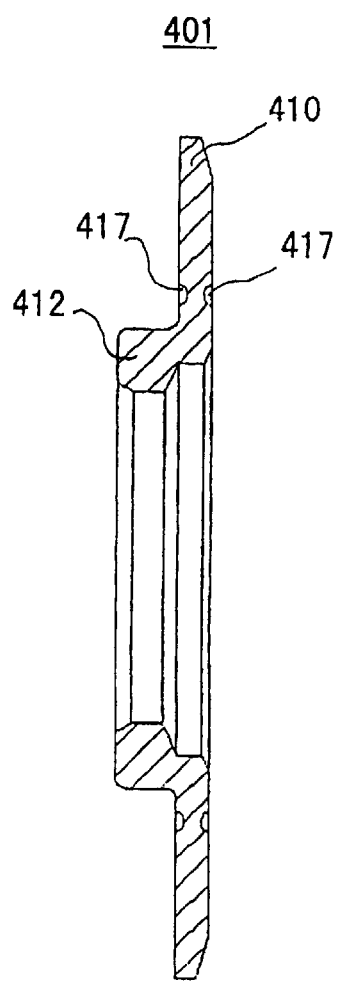
FIG. 6 is a side elevation view of the baseplate illustrating a fourth embodiment of the invention.

FIG. 6 is a side sectional view of a baseplate 401 illustrating a fourth embodiment of the present invention. As shown in FIG. 6, two circular notches of a semi-circle shaped section 417 are formed on both sides of the flange 410. Alternatively, these two notches could all be V or U shaped in their section. On the other hand, one of the notches could be V shaped in its section, and another is U shaped.

The assembling process of the baseplates shown in FIGS. 4–6 is similar to that of the baseplate shown in FIGS. 3a–3c, and therefore, description of the assembling process of the baseplates shown in FIGS. 4–6 will be omitted.

Figure 7:
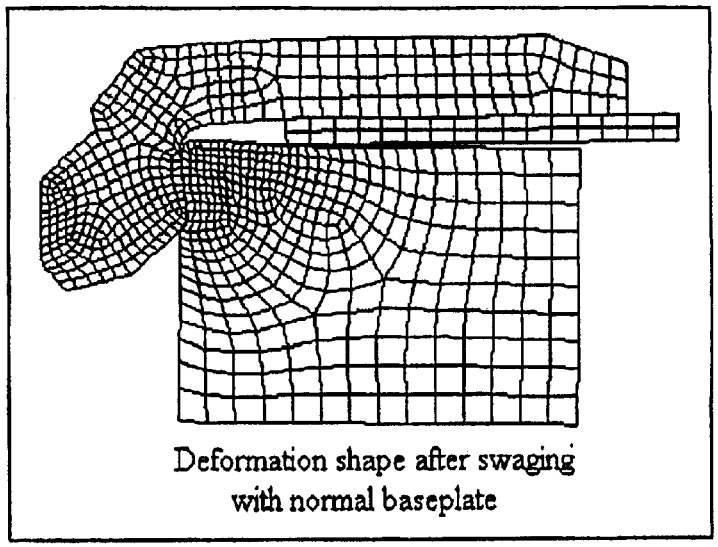
FIG. 7 is a graph illustrating deformation shape after swaging with a conventional baseplate.
Figure 8:
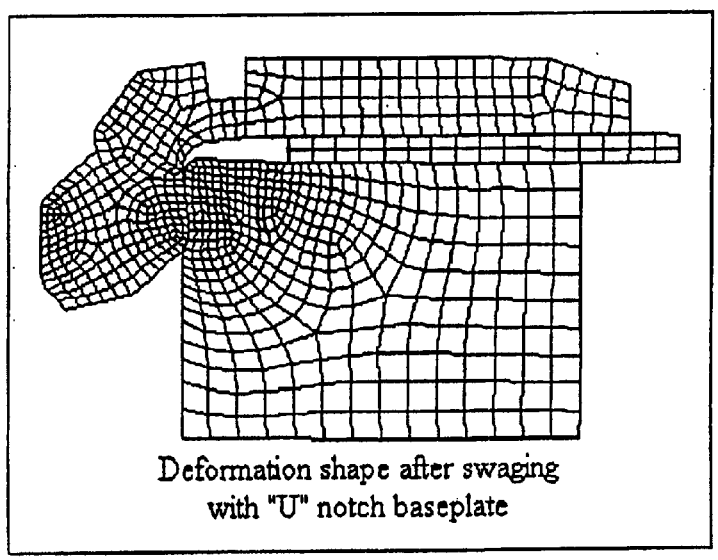
FIG. 8 is a graph illustrating deformation shape after swaging with a "U" notched baseplate of the present invention.

FIG. 7 is a graph illustrating deformation shape after swaging with a conventional baseplate; and FIG. 8 is a graph illustrating deformation shape after swaging with a "U" notched baseplate of the present invention. In comparison of FIGS. 7 and 8, it can be seen that these baseplates of the present invention have also advantages of smaller deformation and larger retention torque during swage operation. Also they are easy to make and have no further cost in production.

Although the invention has been described in detail herein, it should be understand that the invention is not limited to the embodiments described hereinabove, various changes, substitutions and modifications may be made thereto by those skilled in the art without departing from the spirit or scope of the invention as described and defined by the appended claims.

What is claimed is:

1. A baseplate comprising:
   a cylindrical hub having an inner barrel;
   a flat flange; and
   a circular notch formed in said flange and extending from the inner barrel of said cylindrical hub beyond a circumference of said cylindrical hub.

2. A baseplate comprising:
   a cylindrical hub;
   a flat flange;
   a circular notch positioned outside of a circumference of said cylindrical hub, said notch is formed on the side of the flange which is opposite to said hub.

3. A baseplate as set forth in claim 2, wherein said notch is "V" shaped.

4. A baseplate as set forth in claim 2, wherein said notch is "U" shaped.

5. A baseplate as set forth in claim 2, wherein said notch is trapezoid-shaped.

6. A baseplate comprising:
   a cylindrical hub;
   a flat flange; and
   two circular notches are each formed on both sides of said flange.

7. A baseplate as set forth in claim 6, wherein said notches are all "V" shaped.

8. A baseplate as set forth in claim 6, wherein said notches are all "U" shaped.

9. A baseplate as set forth in claim 6, wherein said notches are all semi-circle shaped in their cross-section.

10. A baseplate as set forth in claim 6, wherein one of said notches is "V" shaped, and another of said notches is "U" shaped.

11. A hard disk drive equipped with the arm and suspension assembly as set forth in claim 1.

12. An arm and suspension assembly equipped with the baseplate as set forth in claim 1.

13. An arm and suspension assembly equipped with the baseplate as set forth in claim 2.

14. A hard disk drive equipped with the arm and suspension assembly as set forth in claim 6.

15. An arm and suspension assembly equipped with the baseplate as set forth in claim 6.

* * * * *